United States Patent [19]
Eberman et al.

[11] Patent Number: 5,805,775
[45] Date of Patent: Sep. 8, 1998

[54] APPLICATION USER INTERFACE

[75] Inventors: Brian Scott Eberman, Somerville; Oren David Glickman, Brookline, both of Mass.

[73] Assignee: Digital Equipment Corporation, Maynard, Mass.

[21] Appl. No.: 596,531

[22] Filed: Feb. 2, 1996

[51] Int. Cl.$^6$ ..................................................... G06F 17/20
[52] U.S. Cl. .............................. 395/12; 395/53; 704/257; 704/9
[58] Field of Search ............................... 395/12, 53, 2.79, 395/2.84, 155, 161, 759; 704/257

[56] References Cited

U.S. PATENT DOCUMENTS

| | | | |
|---|---|---|---|
| 5,083,268 | 1/1992 | Hemphhill et al. | 395/12 |
| 5,239,617 | 8/1993 | Gardener et al. | 395/12 |
| 5,282,265 | 1/1994 | Rohra Suda et al. | 395/12 |
| 5,297,040 | 3/1994 | Hu | 364/419.08 |
| 5,321,606 | 6/1994 | Kuruma et al. | 395/12 |
| 5,377,103 | 12/1994 | Lamberti et al. | 395/12 |
| 5,584,024 | 12/1996 | Shwartz | 395/604 |

OTHER PUBLICATIONS

"An Open Agent Architecture" by Philip R. Cohen and Adam Cheyer (both of SRI International), Michelle Wang (Stanford University), and Soon Cheol Baeg (ETRI). [This paper was supported by a contract from the Electronics and Telecommunications Research Institute (Korea).] 1994 AAAI Spring Symposium, pp. 1–8 (Mar. 1994).

"Speechacts: A Testbed for Continuous Speech Applications" by Paul Martin (Sun Microsystems Laboratories, Inc., Chelmsford, Mass.) and Andrew Kehler (Harvard University, Cambridge, Mass.). [This work was done while the second author was at Sun Microsystems.] Proc. AAAI Workshop on the Intergration of Natural Language and Speech Processing, pp. 65–71 (Jul. 1994).

G.B. Winter, "An Automated Knowledge Acquisition System for Model–Based Diagnostics," IEEE Systems Readiness Technology Conf., pp. 167–174, Sep. 1992.

D. Tynan, "What you say is what you get?," PC World, vol. 13, No. 1, pp. 148(8), Jan. 1995.

D. Labriola, "Straight talk on speech recognition," Windows Sources, vol. 3, No. 2, pp. 144(7), Feb. 1995.

G.G. Hendrix, "Human Engineering for Applied Natural Language Processing," Tech. Note 139, Artificial Intelligence Center, SRI International, Inc., Menlo Park, Calif., pp. 1–25, Feb. 1977.

A. Barr and E.A. Feigenbaum, The Handbook of Artificial Intelligence, vol. 1, Addison–Wesley Pub. Co., Inc., pp. 239–243, 343–348, Dec. 1981.

(List continued on next page.)

*Primary Examiner*—Robert W. Downs
*Attorney, Agent, or Firm*—Dirk Brinkman; Alfred A. Stadnicki

[57] ABSTRACT

In a computer system, a user interacts with a plurality of applications using natural language text provided by an input device. In order to enable the applications for user interaction, rules are registered on a blackboard of an arbiter. The arbiter can be localized, or distributed. Each rule is identified with a particular application, and can include a callback procedure. Each rule includes a left-hand side symbol and a right-hand side string which is a translation of the symbol. A parser parses a natural language input text string using the register rules to generate an evaluation tree. The evaluation tree is expressed in the form of an interpretive language. The evaluation tree is interpreted to produce at least one application request. The application request is generated by the callback procedure associated with a specific one of the rules applied during the parsing of the input text. The request is transmitted to the application identified with the applied rule.

16 Claims, 4 Drawing Sheets

OTHER PUBLICATIONS

K.K. Obermeier, "The NLQ Approach to Database Retrieval," 1989 Conf. on National Aerospace and Electronics, pp. 1370–1373, May 1989.

J.R.R. Leavitt and E. Nyberg, "The DIBBS Blackboard Control Architecture and Its Application to Distributed Natural Language Processing," 1990 Int'l. Workshop on Tools for Artificial Intelligence, pp. 202–208, Nov. 1990.

J.–P. Fournier, et al., "A Parallel Architecture for Natural Language Understanding Systems," Proc. Pacific Rim Int'l. Conf. on Artificial Intelligence, pp. 787–792, Nov. 1990.

B.Z. Manaris, et al., "Developing Natural Language Interfaces through NALIGE," 1994 Int'l. Conf. on Tools with Artificial Intelligence, pp. 260–266, Nov. 1994.

M. Braunwarth, et al., "Dialect 2: an information retrieval system based on distributed artificial intelligence tools," 1994 Int'l. Conf. on Tools with Artificial Intelligence, pp. 800–803, Nov. 1994.

W.H. Youmans, III, "Using Distributed Artificial Intelligence Techniques for Natural Language Processing," Moving Towards Expert Systems Globally in the 21st Century, pp. 1089–1093, Dec. 1994.

X. Huang, et al., "Microsoft Windows Highly Intelligent Speech Recognizer: Whisper," ICASSP '95: Acoustics, Speech & Signal Processing Conf., pp. 93–96, May 1995.

FIG. 4

APPLICATION USER INTERFACE

FIELD OF THE INVENTION

This invention relates generally to enabling applications for user interaction, and more specifically to enabling applications for user interaction using natural language.

BACKGROUND OF THE INVENTION

Users of computer systems desire to interact with application software programs (applications) for command and control. In many traditional computer systems, for example, in personal computers, applications are represented as icons in windows. The windows can group sets of related applications. Users serially select applications for execution by pointing and "clicking" on a window or icon using an electronic mouse. These types of systems have what are known as window/icon-mouse/pointer (WIMP) interfaces.

Once an application has been selected, users interact directly with the selected application, using, for example, text input devices, such as keyboards. Typically, the windows and icons present a complex menu selection structure. In addition, the interaction between the users and applications proceed serially. This means that it is not readily possible for users to supply a single command phrase to interact with multiple applications. Furthermore, as a disadvantage of such prior art systems, commands and frameworks used to control one application may not be compatible with commands and frameworks of another application.

More complex prior art interactive interfaces for command and control of applications use a common framework. Within the common framework, during a first stage, a recognition sub-system can convert input commands, for example, in the form of speech, to text. In a second stage, the text is parsed using a lexicon and a set of grammar production rules. In a third stage, the parsed text is processed by an expert system to control the applications. Known systems differ in the complexity of their implementations.

The most common type of framework uses simple keywords, and a text parser. A context switching mechanism ensures that only one lexicon, and one command set of an application are active at any one time. A particular lexicon and command set can be determined by reading a menu, or window structure, or by having the user associate a particular key word or command phrase using keyboard defined macros. This type of interface is simple and provides little beyond that which is provided by WIMP interfaces. Since this type of framework requires that a single application be active at any one time, the user cannot control multiple applications with a single command phrase.

In another type of framework, the user navigates through a menu tree or graph using a finite state machine. In a given state, a user can select specific options of the application. This type of framework is typically found in a telephone-based inquiry system. There, touch-tones or simple voice commands are used to select menus and options within the menus. With this type of framework, the menus are preconstructed, and the options within menus are usually predetermined. It is difficult to dynamically add new applications to the menu structure, and the grammar of the commands is severely limited, e.g., numbers, and "yes," or "no."

Some application interfaces provide more complex processing of dialogues in natural languages. For example, the expert system can log the input dialogue and its parsings in order to resolve ambiguous state transitions. The expert system can then use semantic representations to determine the best interpretation of the command phrase given the current context state of the dialogue.

Because of the complexity of the grammar and dialogue mechanisms used with natural language text processing, the expert system is usually tailored to a predefined set of applications. Such systems are difficult to build, and most components are predefined. Typically, it is not possible to adapt the grammar designed to interface with one set of applications to other sets of applications since the grammar and context of the user interaction as expressed in the dialogue is centrally maintained. Thus, such natural language interfaces tend to be less flexible than simple WIMP interfaces.

There is a need for an application user interface which can share grammar and rules among many applications. Furthermore, the interface should dynamically admit new applications for interaction without requiring a redesign and rebuild of the system. In addition, it should be possible for a user to interact with multiple applications using natural language input text.

SUMMARY OF THE INVENTION

Disclosed is a computer implemented method and apparatus for enabling users to interact with multiple software applications using natural language text. In one aspect of the invention, the natural language text can be derived from speech using a speech recognition engine.

Applications desired for user interaction register rules on a blackboard of an arbiter. The arbiter can be local to an application, or the arbiter can be accessible via a network of a distributed computer system. Each registered rule is identified with the application which registered the rule. A rule can also be associated with a callback procedure. The callback procedures can be registered along with the rules, or callback procedures can be separately registered and referenced by function name in the rules.

Each rule includes a left-hand side symbol and a right-hand side string which is a translation of the symbol. The right-hand side string can include further symbols. Natural language input is obtained from an input device and parsed by a parser of the arbiter. The parser applies the registered rules to produce an evaluation tree. The evaluation tree is expressed in the form of an interpretive language.

An evaluator of the arbiter interprets the evaluation tree to produce at least one application request. The application request is generated by the callback procedure associated with one of the rules applied during the parsing. The request is transmitted to the application identified with the applied rule. The request causes the application to perform a desired action.

In one aspect of the invention, the symbol can be declared private or public. A public symbol can be included in the rules registered by more than one application. A private symbol can only be included in the rules of exactly one application. In one embodiment of the invention, the rules are expressed in a context-free grammar.

DETAILED DESCRIPTION OF A PREFERRED EMBODIMENT

Figure 1:
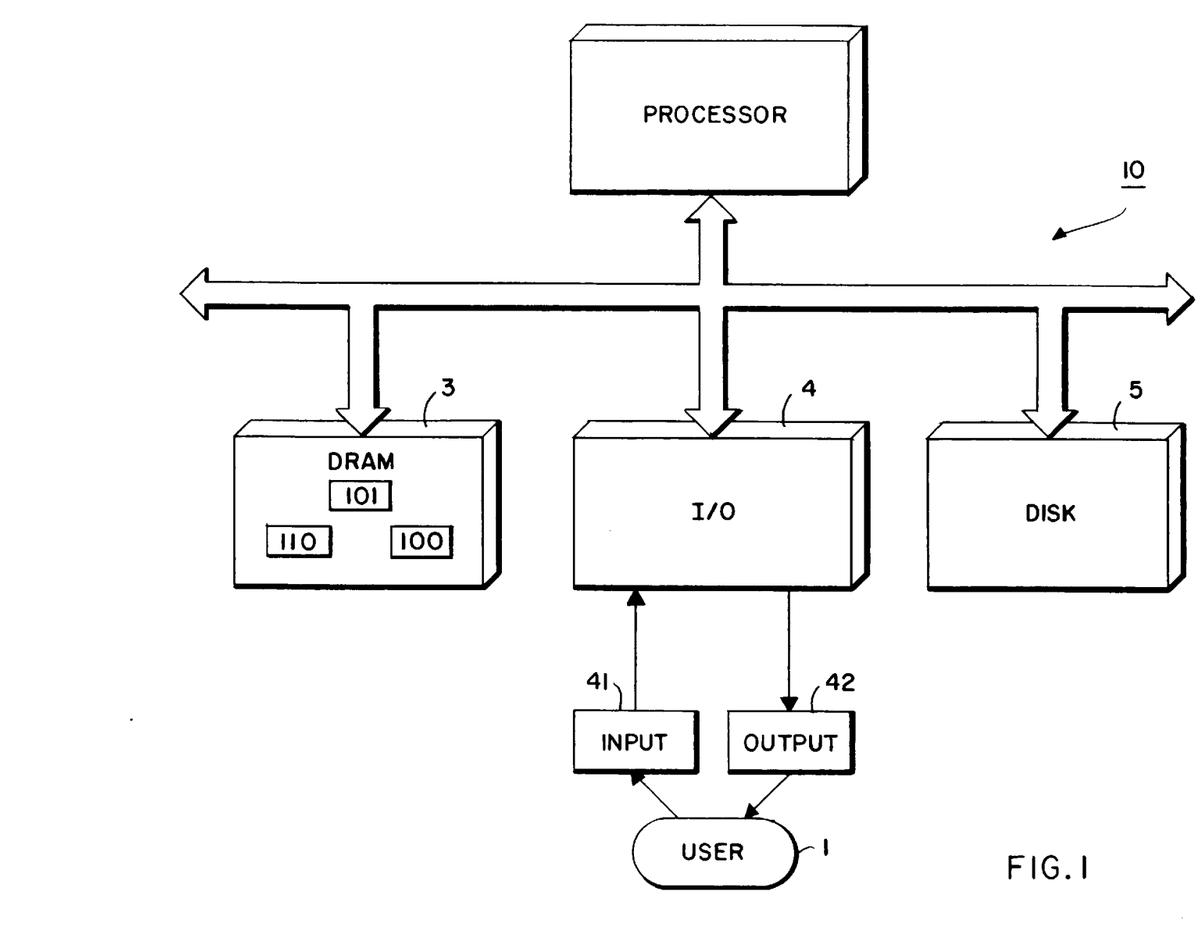
FIG. 1 is a block diagram of computer system including an application user interface according to the principles of the invention.

As shown in FIG. 1, a user 1 desires to command and control a computer system 10 using natural language interactions. The computer system 10 includes a processor 2, a dynamic random access memory (DRAM) 3, input/output interfaces 4, and persistent memory storage 5, all connected by buses 6.

The processor 2 can be operated by reduced or complex instruction sets. The DRAM 3 can be formed of semiconductor devices. The persistent memory can store signals in magnetic or optical form. The I/O interfaces 4 can receive and transmit signals as input 41 and output 42 in various modalities, including, as an advantage of the invention, acoustically detectable signals, e.g., speech. The disk 5 can store application and operating system software to operate the computer 10 under command and control of input 41. The buses 6 communicate with the connected components 2–5 according to standard signaling protocols.

During operation of the computer 10 by the user 1, applications 110 are executed by the processors 2 under control of the operating software system 101. The applications 110, in response input 41, produce output 42 for the user 1.

It is a problem to control the applications 110 in a coordinated fashion. Therefore, the computer 10 also includes an application user interface, including an arbiter 100 according to a preferred embodiment of the invention. The application interface includes processes and data structures stored in the memories 3 and 5. The arbiter 100 allows the user 1 to control the activities of multiple applications 110 in a coordinated manner using a single natural language command phrase.

Figure 2:
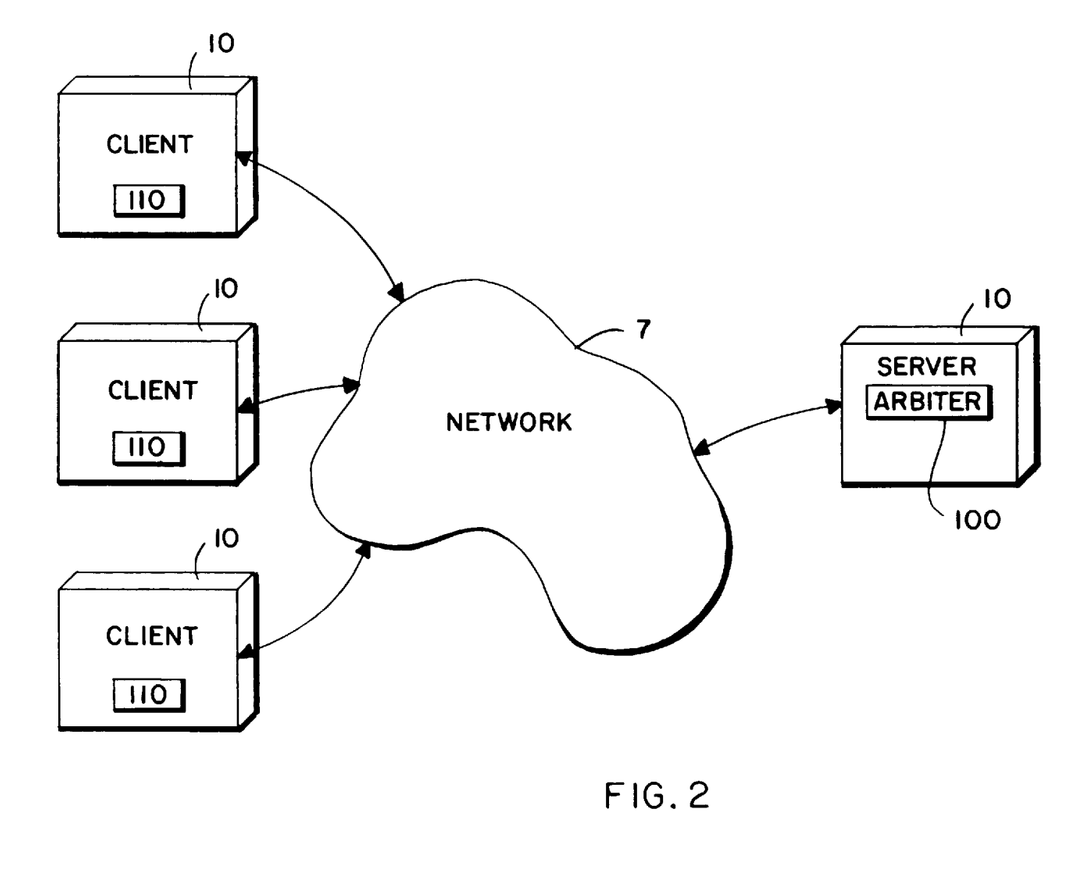
FIG. 2 is block diagram of a distributed computer system including an application user interface according to the principles of the invention.

FIG. 2 shows an alternative embodiment of the invention. Here, a plurality of computers 10 are connected to each other by a network 7 in a distributed computer environment. The network 7 is virtually an extension of the buses 6, and also communicates according to a standard protocol. Some of the computers 10 are designated client computers (clients), and at least one computer is designated a server computer. Here, the applications 110 of the clients 10 are also interfaced in a coordinated manner, in part, by the arbiter 100 of the server computer to facilitate the control of the applications 110.

Figure 3:
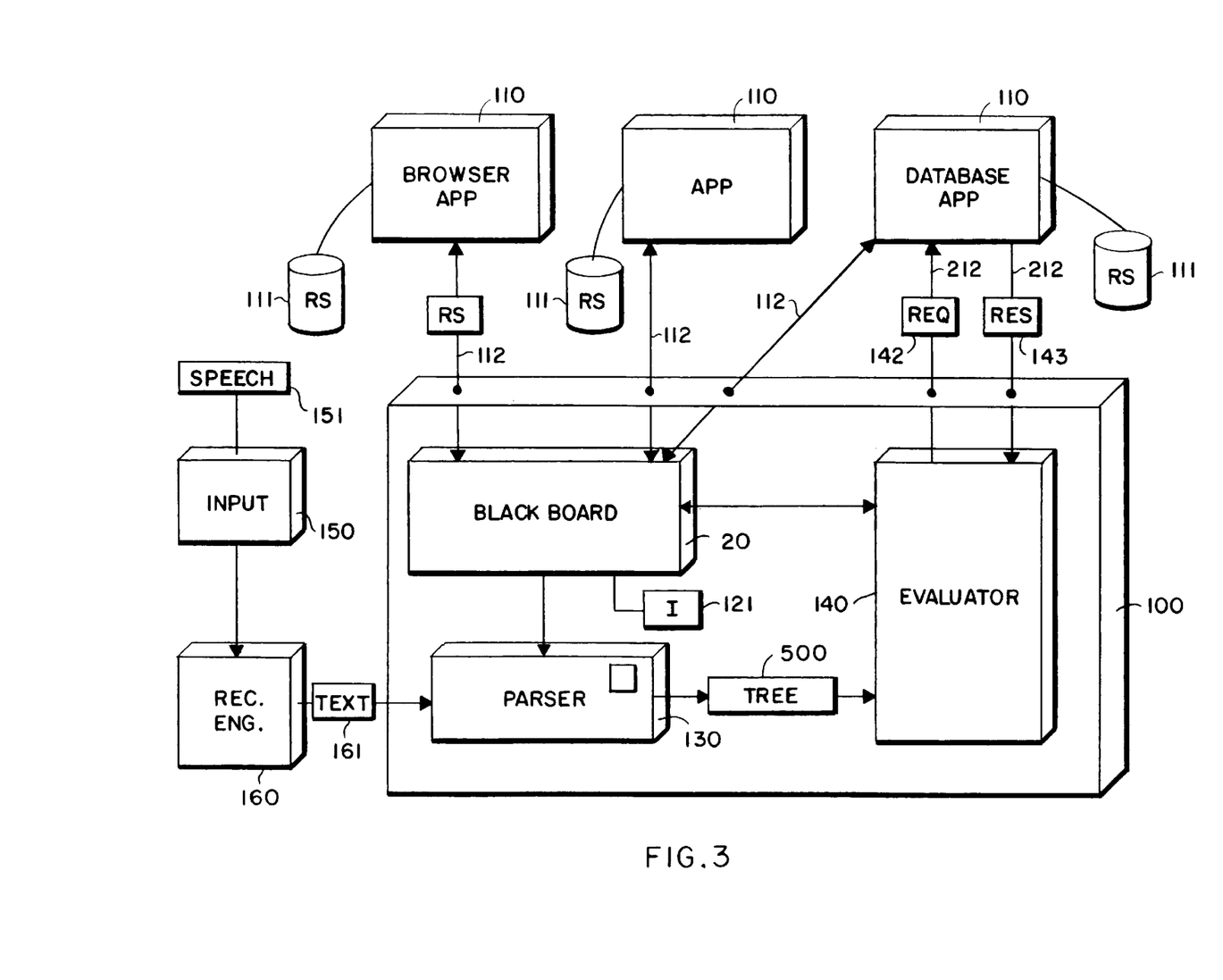
FIG. 3 is a block diagram of the application user interfaces of FIGS. 1 and 2, including an arbiter.

FIG. 3, shows an application user interface according to a preferred embodiment of the invention. The interface includes the arbiter 100 connected to a plurality of applications (APP) 110. The arbiter 100 includes a blackboard 120, a parser 130, and an evaluator 140.

As described above, the applications 110 can be local or distributed. Associated with each application 110 is a rule set (RS) 111. Each rule set 111 can be stored on the disk-system 5 accessible by the applications 110, while the applications 110 are executing in the processor 2.

The blackboard 120 can be in the form of data structures stored in the memories 3 and 5 of the computer 10 of FIG. 1, or the server computer of FIG. 2. The parser 130 can operate according to rule sets recorded on the blackboard 120. An input device 150 is connected to the parser 130. The input device 150 can be a mouse, a keyboard, or as an advantage of the invention, a speech input mechanism, such as a microphone, or a telephone. If the input is in the form of speech, the input device 150 is connected to a speech recognition engine (REC. ENG.) 160.

In general, the operation of the user interface is as follows. In order to allow a user to command and control the applications 110, the desired applications 110 register their rule sets set 111 with the arbiter 100. This can take place locally, or in the distributed computer system of FIG. 2, via the network 7. Registering means that the rule sets 111 associated with the desired applications are recorded on the blackboard 120 of the arbiter 100. The registration can take place by sending messages over the communication lines 112, or the network 7 operating according to standard message passing communications protocols.

The rules, described in greater detail below, are in the form of a pairing of a context-free grammar style production rule with an optional expression. The expression can have the syntax of an interpretive language, for example, LISP, or Tcl, see "Tcl and the Tk Toolkit," John K. Ousterhout, Addison Wesley, 1994.

After the desired applications 110 have registered their rule sets with the arbiter 100, the arbiter 100 can process input control commands and phrases. The input can be in the form of text, delimited strings, or, according to a preferred embodiment of the invention, natural language speech 151.

In the case of speech, the voice signals of the speech 151 are converted to computer readable natural language text 161 by the recognition engine 160. It should be understood that the invention can also be worked with conventional natural language input text typed on a keyboard, or supplied to the arbiter 100 by some other input means such as the communications network 7 of FIG. 2.

The parser 130, using the rules registered on the blackboard 120, creates an evaluation tree 500. The evaluation tree 500 is expressed as a string in the form of the base interpretive evaluation language, for example, Tcl.

The evaluation tree 500 is evaluated by the evaluator 140. As a result of the evaluation, application requests 142, e.g., actions, are generated by the evaluator 140. As an advantage of the invention, and in contrast with prior art interactive frameworks, the evaluation tree 500 is directly derived from the natural language input by the parser 130. This eliminates the need for a post-parsing expert system as in the prior art. In response to the requests 142, the applications 110 perform the desired actions and reply responses or results (RES) 143. The results 143 can include an indication, whether or not the requests were successfully processed.

Figure 4:
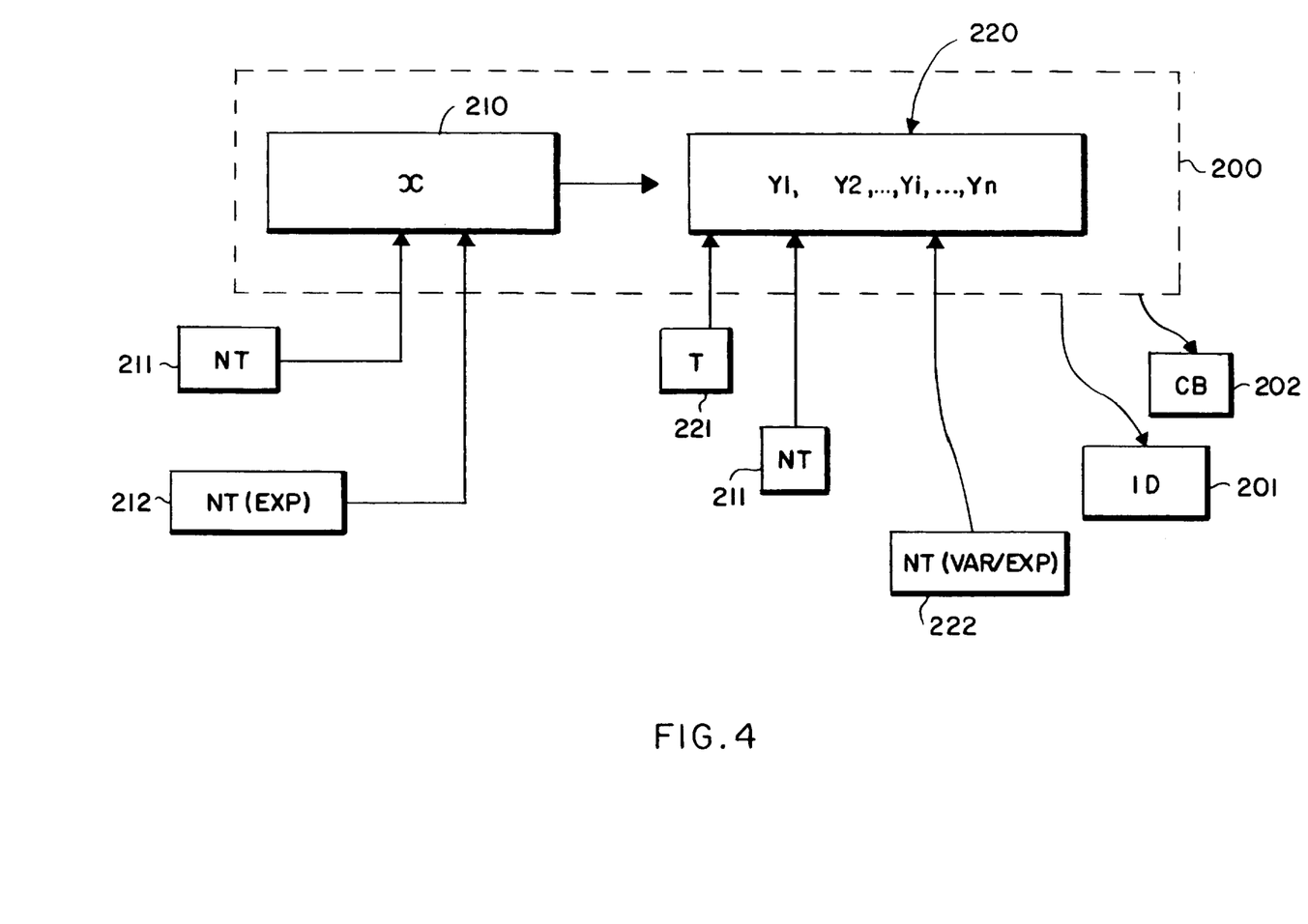
FIG. 4 is a block diagram of a rule used by the arbiter.

Now with reference to FIG. 4, the rules of the rule sets 111, according to the preferred embodiment of the invention, are described in greater detail. Each registered rule 200 is a production rule expressed in, for example, a context-free grammar style. Associated with each rule 200, is a left-hand side 210, and a right-hand side 220. Also associated with each rule 200 is an identification (ID) 201, and an optional application specific callback procedure (CB) 202.

Alternatively, callback procedures can be registered independently of the rules. In this case, the callback procedures can be referenced by function names included in the rules.

The ID 201 of the rule 200 identifies the specific application which registered the rule. The callback procedure 202 is used by the evaluator 140 to generate a request which will induce the application to take the appropriate actions. Since the applications 110 are responsible for providing the callback procedures 202, as an advantage, the arbiter 100 according to the invention is relieved of having specific internal knowledge of the applications 110.

The left-hand side 210 of the rule 200 includes either a non-terminal (NT) symbol 211, or alternatively, an NT symbol associated with an expression (NT(exp)) 212. The expression is formed using the chosen base interpretive evaluation language, e.g., Tcl, referenced above.

The right-hand side 220 comprises one or more substrings ($Y_i$). Each sub-string $Y_i$ can be a terminal symbol (T) 221, e.g., a lexicon entry, a non-terminal symbol 211, or a NT symbol associated with a variable or an expression (NT(var/exp)) 222. The rule 200 defines a mapping between the left-hand side 210, and the right-hand side 220.

In the example rules given below, the following notations will be used. Non-terminal symbols 211 are expressed as uppercase characters (A, B, . . . , Z, etc.), and terminal symbols are expressed as lowercase characters (a, b, . . . , z, etc.). The character "@", is used as a start symbol.

As an advantage of the invention, the non-terminal symbols can be declared public or private. A public symbol starts with a colon ":". If the non-terminal symbol is declared as a public symbol, then the symbol can be shared among all of the desired applications 110 that have rules 200 registered on the blackboard 120. Shared meaning that any of the application 110 can include a rule which includes as an element a public symbol. This feature of the invention, in part, allows a single command phrase to interact with multiple applications.

The processes of registering, parsing, and evaluating are now described in greater detail. The processes and associated data structures allow the user 1 to interact with multiple applications in a coordinated and natural manner using singular command phrases.

Registering

The user 1, wishing to interact with multiple application 110, registers their associated rule sets 111 with the arbiter 100 using the lines 112 or the network 7, and standard message passing protocols. The arbiter 100 can be local or distributed, see FIGS. 1 and 2.

New rules can be added to the blackboard 120, and registered rules can be removed, as long as a communication session is maintained between the applications and the arbiter 100. In addition, any of the registered rules can be enabled or disabled. Furthermore, an application can be deactivated by removing the associated rule set 111 from the blackboard 120. Also, the user 1 can selectively force the arbiter 100 to only recognize rule sets of specified applications. A table or index (I) 121 can dynamically indicate the states of the rules registered on the blackboard 120.

Parsing

Input 41, perhaps in the form of natural language text 161 derived from input speech 151 by the recognition engine 160, is parsed by the parser 130. Parsing means finding the sequence of rules which when applied would produce the input text 161.

While parsing, any variables (var) of an expression (exp) of a non-terminal symbol 212 may be assigned values by applying appropriate rules on the input text 161. Since the rules are identified with particular applications, the rules are considered distinct from each other. Therefore, a specific non-terminal symbol of a rule can only be combined with symbols associated with the same rule set, or symbols of rules declared public.

During operation, the parser 130 rewrites character strings $Y_i$ exactly recognized in portions of the input text 161 according to the registered grammar rules 200. Portions of the input text 161 recognized as corresponding exactly to a right-hand side 210 of one of the rules 200, e.g., the substrings $Y_i$, are rewritten as the left-hand side 210.

This means that a rule can be applied if the right-hand side 220 of a rule exactly matches the current state of the text being parsed. In the case where the right-hand side of a rule is expressed as a non-terminal symbol including variable, e.g., NT(var) 222, any input text including the non-terminal symbol will be considered to conform. In addition, if a variable is recognized in an expression (exp) of the left-hand side of a rule, the variable is assigned the value stated in the right-hand side of the rule.

For example, the user 1 may direct a browsing application to register the following rules on the blackboard 120 as:

| | |
|---|---|
| @[open_url (x)]→open :URL (X) | (Rule 1) |
| :URL(http:/www.altavista.digital.com)→altavista | (Rule 2) |

In addition, a database application registers the rules:

| | |
|---|---|
| NAME("JOHN DOE")→doe | (Rule 3) |
| :URL([get_home_page X])→the home page of NAME (X) | (Rule 4) |

Subsequently, the following command phrase is supplied as natural language input text 161:

open the home page of doe

The parser 120, using the registered rules, rewrites the input text by applying the rules as indicated. Here, the rewritten portions of the text are indicated in a bold typeface.

| | |
|---|---|
| open the home page of NAME("JOHN DOE") | (Rule 3) |
| open :URL([get_home_page "JOHN DOE"]) | (Rule 4) |
| @([open_$_{url}$ [$_{get}$_home_page "JOHN DOE"]]) | (Rule 1) |

The parsing of the input text 161 is completed when the rewritten text begins with the start character "@". The final rewritten text is the evaluation tree 500. As an advantage of the invention, the parsing can be performed without any interaction with the applications 110. This means that the parsing can proceed more efficiently, particularly, if the interface is operating in a distributed computer system as shown in FIG. 2.

Evaluating

The evaluation tree 500 is passed to the evaluator 140 in form of an interpretable string. The string can be immediately interpreted by the evaluator 140 according of the base interpretive language use to express the tree 500. For example, the sub-string:

[get_home_page "JOHN DOE"], will cause a "get_$_{home}$_page" request 142 to be generated by a "get_home_page" callback procedure associated with the database application. The request has as a parameter the value "JOHN DOE." The database application, in response, replies the universal resource locator (url) of JOHN DOE's home page. Upon receiving the resultant reply 143, the evaluator 140 can request the opening of the JOHN DOE's home page as expressed in the url. Similarly, using Rule 2, a user can request the opening of the "altavista" home page.

With the registration of additional rule sets of, for example, word processing or mail applications, memos prepared by the word processing application can be sent using the mail application using natural language input text command phrases.

As an advantage of the invention, the context of the user interaction as expressed in the natural language interaction is entirely distributed across the applications, and not by the arbiter as may be the case in prior art common framework implementations. This enables the interfacing to many different applications without a redesign of the arbiter.

The principles of the invention have been described with respect to specific embodiments, for example, using rules described in a context-free grammar. It is also possible to extend the rules to include stochastic context-free grammars, feature based grammars, and unification grammars. It will be apparent to those skilled in the art that various modifications can be made to the embodiments shown. Therefore, the spirit and scope of the invention are set out in the appended claims.

We claim:

1. A computer implemented method for interacting with a plurality of applications of a computer system using natural language text provided by an input device, comprising the steps of:

registering a plurality of rules on a blackboard, each rule identified with a particular application by use of an identifier, each rule including a left-hand side symbol and a right-hand side string which is a translation of the symbol, parsing a natural language input text string by applying the registered rules to generate an evaluation tree expressed in the form of an interpretive language; and interpreting the evaluation tree, and generating a request by a callback procedure associated with a specific one of the rules used to generate the evaluation tree;

transmitting the request to a specific one of the applications associated with the specific one of the rules.

2. A computer implemented method for interacting with a plurality of applications of a computer system using natural language text provided by an input device, comprising the steps of:

registering a plurality of rules on a blackboard, each rule identified with a particular application, each rule including a left-hand side symbol and a right-hand side string which is a translation of the symbol;

declaring the symbol as a private symbol or as a shared symbol, the shared symbol being included in the rules of more than one of the applications, and the private symbol included in the rules of exactly one application;

parsing a natural language input text string by applying the registered rules to generate an evaluation tree expressed in the form of an interpretive language; and interpreting the evaluation tree, and generating a request by a callback procedure associated with a specific one of the rules and used to generate the evaluation tree;

transmitting the request to a specific one of the applications associated with the specific one of the rules.

3. The method of claim 2 further comprising:

deriving the natural language input text from speech using a speech recognition engine.

4. The method of claim 2 where the rules are expressed in a context-free grammar.

5. The method of claim 2 wherein the left-hand side symbol is a non-terminal symbol or a non-terminal symbol associated with an expression, and the right-hand side string includes a plurality of sub-strings, each sub-string expressed as a terminal symbol, the non-terminal symbol, or the non-terminal symbol associated with a variable or an expression.

6. The method of claim 5 further comprising:

expressing the non-terminal symbol using uppercase characters; and expressing the terminal symbol using lowercase characters.

7. The method of claim 2 wherein the blackboard includes an index and further comprising:

maintaining states of the rules registered on the blackboard by the plurality of applications using the index to entirely distribute context states of user interactions as expressed in the natural language input text string across the plurality of applications.

8. The method of claim 2 further comprising:

distributing the applications over a plurality of client computers, and registering the rules with the blackboard of an arbiter of a server computer connected to the client computers by a network.

9. The method of claim 2 further comprising:

communicating the rules to the blackboard using communication protocols.

10. An apparatus for interacting with a plurality of applications of a computer system using natural language text provided by an input device, comprising:

a blackboard for registering a plurality of rules, each rule identified with a particular application by use of an identifier, each rule including a left-hand side symbol and a right-hand side string which is a translation of the symbol;

a parser for parsing a natural language input text string by applying the registered rules to generate an evaluation tree expressed in the form of an interpretive language; and an evaluator for generating a request to one of the applications, the evaluator including a callback procedure associated with a specific one of the rules applied during the parsing, the request to direct a specific one of the applications associated with the specific one of the rules to perform a desired action.

11. An apparatus for interacting with a plurality of applications of a computer system using natural language text provided by an input device, comprising:

a blackboard for registering a plurality of rules, each rule identified with a particular application, each rule including a left-hand side symbol and a right-hand side string which is a translation of the symbol;

a parser for parsing a natural language input text string by applying the registered rules to generate an evaluation tree expressed in the form of an interpretive language;

an evaluator for generating a request to one of the applications, the evaluator including a callback procedure associated with a specific one of the rules applied during the parsing, the request to direct a specific one of the applications associated with the specific one of the rules to perform a desired action; and means for declaring the symbol as a private symbol or as a shared symbol, the shared symbol being included in the rules of more than one of the applications, and the private symbol included in the rules of exactly one application.

12. The apparatus of claim 11 further comprising:

speech recognition means for deriving the natural language input text.

13. The apparatus of claim 11 further comprising:

an index for maintaining states of the rules registered on the blackboard.

14. The apparatus of claim 11 wherein the plurality of applications are distributed over a plurality of client computers, and the blackboard, parser, and evaluator are maintained by a server computer connected to the plurality of client computers by a network.

15. A computer implemented method for interacting with a plurality of applications of a computer system using natural language text provided by an input device, comprising the steps of:

registering a plurality of rules on a blackboard, each rule identified with a particular application, each rule including a left-hand side symbol and a right-hand side string which is a translation of the symbol and a unique identifier for each particular application;

parsing a natural language input text string by applying the registered rules to generate an evaluation tree expressed in the form of an interpretive language; and interpreting the evaluation tree;

transmitting the request to a specific one of the applications associated with the specific one of the rules in response to said unique identifier associated with each particular application.

16. An apparatus for interacting with a plurality of applications of a computer system using natural language text provided by an input device, comprising:

a blackboard for registering a plurality of rules, each rule identified with a particular application by use of a unique identifier, each rule including a left-hand side symbol and a right-hand side string which is a translation of the symbol;

a parser for parsing a natural language input text string by applying the registered rules to generate an evaluation tree expressed in the form of an interpretive language; and an evaluator for generating a request to one of the applications the request to direct a specific one of the is applications associated with the specific one of the rules to perform a desired action in response to the unique identifier of the specific on of the rules.

* * * * *